(12) United States Patent
Bae et al.

(10) Patent No.: US 10,729,989 B2
(45) Date of Patent: Aug. 4, 2020

(54) DEVICE FOR CONTROLLING INTERFACE OF LIQUID-LIQUID EXTRACTION COLUMN USING PRESSURE EQUILIBRIUM

(71) Applicants: Youngmoon Bae, Daejeon (KR);
Seungchul Yang, Daejeon (KR);
Byungkuk Lee, Sejong (KR);
Dongyong Kwak, Daejeon (KR);
Hyunkwang Cho, Daejeon (KR)

(72) Inventors: Youngmoon Bae, Daejeon (KR);
Seungchul Yang, Daejeon (KR);
Byungkuk Lee, Sejong (KR);
Dongyong Kwak, Daejeon (KR);
Hyunkwang Cho, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 16/257,186

(22) Filed: Jan. 25, 2019

(65) Prior Publication Data

US 2019/0168133 A1  Jun. 6, 2019

Related U.S. Application Data

(63) Continuation of application No. PCT/KR2016/013025, filed on Nov. 11, 2016.

(30) Foreign Application Priority Data

Jul. 25, 2016  (KR) .................. 10-2016-0093904

(51) Int. Cl.
*B01D 11/04*  (2006.01)
*G05D 16/00*  (2006.01)

(52) U.S. Cl.
CPC .......... *B01D 11/0488* (2013.01); *B01D 11/04* (2013.01); *B01D 11/0484* (2013.01); *G05D 16/028* (2019.01)

(58) Field of Classification Search
CPC . B01D 11/04; B01D 11/0484; B01D 11/0488; B01D 17/0208; B01D 17/0214; B01D 17/12; G05D 16/028
See application file for complete search history.

(56) References Cited

U.S. PATENT DOCUMENTS

| | | | | |
|---|---|---|---|---|
| 2,729,550 A | * | 1/1956 | Maycock | B01D 11/0484 208/319 |
| 2,852,349 A | * | 9/1958 | Hicks | B01D 11/043 422/257 |

(Continued)

FOREIGN PATENT DOCUMENTS

| | | |
|---|---|---|
| CN | 203678000 | 7/2014 |
| GB | 1491252 | 11/1977 |

(Continued)

*Primary Examiner* — Terry K Cecil
(74) *Attorney, Agent, or Firm* — Reinhart Boerner Van Deuren P.C.

(57) ABSTRACT

Disclosed is a device for controlling an interface of a liquid-liquid extraction column using pressure equilibrium. The device includes a vertical pipe provided beside an extraction column parallel thereto. The device enables internal pressures of the extraction column and the vertical pipe to be balanced with each other by moving fluid from the extraction column into the vertical pipe. Therefore, the device can maintain the level of an interface between fluids having different specific gravities with a simple control system. The device includes the liquid-liquid extraction column having a column body; and upper and lower tanks having respective inlet pipes and respective outlet pipes, wherein a pipeline is connected to the outlet pipe of the lower tank, and the internal pressures are balanced by controlling a level of the fluid in the pipeline, thereby maintaining the level of the interface.

1 Claim, 2 Drawing Sheets

(56) References Cited

U.S. PATENT DOCUMENTS 3,661,260 A * 5/1972 Koga .................. C10G 33/06
585/800
5,194,152 A * 3/1993 Takacs ................ B01D 11/043
210/255

FOREIGN PATENT DOCUMENTS

| | | |
|---|---|---|
| JP | S52-26283 U1 | 2/1977 |
| JP | 54-010276 | 1/1979 |
| JP | 55-001838 A | 1/1980 |
| JP | 55-022362 | 2/1980 |
| JP | 59-169506 | 9/1984 |
| JP | S59-169506 | 9/1984 |
| JP | 4-502578 | 5/1992 |
| JP | 04-314706 | 11/1992 |
| JP | 05-200260 | 8/1993 |
| JP | 06-064701 U | 9/1994 |
| KR | 1020140064669 | 5/2014 |
| WO | WO 91/01170 | 2/1991 |

* cited by examiner

DEVICE FOR CONTROLLING INTERFACE OF LIQUID-LIQUID EXTRACTION COLUMN USING PRESSURE EQUILIBRIUM

CROSS-REFERENCE TO RELATED PATENT APPLICATIONS

This patent application is a continuation of PCT/KR2016/013025, filed Nov. 11, 2016, which claims priority to Korean Patent Application No. 10-2016-0093904, filed Jul. 25, 2016, the entire teachings and disclosure of which are incorporated herein by reference thereto.

TECHNICAL FIELD

The present invention relates generally to a device for controlling an interface of a liquid-liquid extraction column using pressure equilibrium. More particularly, the present invention relates to a device for controlling an interface of a liquid-liquid extraction column using pressure equilibrium, the device controlling an interface between fluids having different specific gravities in an upper tank of the extraction column by using a vertical pipe that enables an internal pressure of the extraction column and an internal pressure of the vertical pipe to be balanced with each other.

BACKGROUND ART

Generally, a principle of solvent extraction is known as follows.

When one solvent containing a solute is in contact with another solvent that does not contain the solute (or contains only a small amount of the solute), the solute moves from one solvent to another solvent up to the time when solute concentrations in the solvents are balanced with each other.

As described above, liquid-liquid extraction denotes a unit operation whereby a solute is transferred from one solvent to another solvent to be separated by the solubility difference between the two solvents that are immiscible.

A conventional operation of the liquid-liquid extraction is a countercurrent operation of two liquids, namely an operation of the two liquids being moved in opposite directions to be in contact with each other.

In an extraction of a conventional extraction column extending vertically, the two liquids are a light phase liquid and a heavy phase liquid.

In the meantime, after completing the extraction, in order to separate desired solute and solvent, first, it is desired to separate the solvent containing the solute and the solvent that lost the solute. Here, generally, a specific gravity difference between the two solvents is used in the conventional extraction column.

The conventional extraction column may be understood by referring to FIG. 1, which shows a schematic view of a liquid-liquid extraction column.

The conventional liquid-liquid extraction column in FIG. 1 includes an upper tank 20 and a lower tank 30 respectively provided at an upper end and a lower end of the column body 10. After extracting the solute from fluid A and fluid B, fluid A and fluid B are separated, and are respectively discharged from the lower tank 30 and the upper tank 20.

The upper tank 20 and the lower tank 30 have respective inlet pipes 21 and 31 and have respective outlet pipes 22 and 32 through which the fluids are introduced and separated fluids are discharged.

Here, a control valve 32a is provided at the outlet pipe 32 of the lower tank 30. The control valve controls outflow rate to maintain the level of an interface between the two separated fluids having different specific gravities in the upper tank 20.

With such configuration, through a series of processes in the column body 10, the fluid A having high specific gravity is discharged from the lower tank 30 through the outlet pipe 32. The fluid B having low specific gravity is discharged from the upper tank 20 through the outlet pipe 22.

Here, the fluid B having low specific gravity accumulates due to the level of the interface, and thus, fluid B is naturally discharged through the outlet pipe 22. Fluid A having high specific gravity is artificially discharged by the controlling of the control valve 32a.

In the meantime, in a continuous process using the conventional liquid-liquid extraction column, in order to separate the two fluids after the extraction, it is desired to maintain the point at which the two fluids are separated during the process, namely, the level of the interface between the two fluids.

In the process of separating the two fluids having different specific gravities after extracting the solute, when the level of the interface between the fluids A and B is excessively increased, the fluid A may be discharged from the upper tank 20 through the outlet pipe 22. Therefore, it is desirable to maintain the level of the interface between the fluids A and B having different specific gravities in the upper tank 20 within a certain range.

To this end, a measuring device 40 measures the level of the interface in the upper tank 20. The control valve 32a of the lower tank 30 controls the outflow rate of the fluid A. Therefore, the level of the interface in the upper tank 20 is maintained or controlled by adjusting the total level of the fluids in the extraction column.

Here, as a method of measuring the level of the interface in the upper tank 20, there is a method of using a density measuring device or a level switch, etc. to check whether or not the level of the interface is higher than a preset level, or a method of using a level transmitter for measuring the interface, or a method of using pressure difference between the upper-lower ends of the upper tank 20 to continuously measure the level of the interface, etc.

Here, theoretically, inflow rate is steady in an equilibrium state. Therefore, when the outflow rate is steadily maintained, the level of the interface is required to be steadily maintained. However, in a real operation, it is difficult to precisely and steadily maintain the inflow rate. Moreover, slight changes of the level of the interface, or errors caused by electromagnetic interferences in a control system, etc. are used for feedback. Therefore, an opening ratio of the control valve 32a continuously changes such that it is difficult to steadily maintain the outflow rate.

Consequently, it is difficult to steadily maintain the level of the interface in the upper tank 20.

Moreover, the life of the control valve 32a is shortened by the continuous operation of the control valve 32a.

In addition, various measuring devices 40 are used for the interface measurement as described above. In order to transmit and receive measurement signals between the control valve 32a and the measuring devices 40, a complex control system is required.

Furthermore, since the control system is complex as described above, the demand for maintenance increases, thereby increasing maintenance costs. In addition, work efficiency decreases due to increased man hours.

DOCUMENTS OF RELATED ART

Patent Document (Patent Document 1) Korean Patent Application Publication No. 10-2014-0064669.

BRIEF SUMMARY

Accordingly, the present invention has been made keeping in mind the above problems occurring in the related art, and the present invention is intended to propose a device for controlling an interface of a liquid-liquid extraction column using pressure equilibrium, the device including a vertical pipe located at an outside position of an extraction column, the vertical pipe enabling an internal pressure thereof to be maintained. A level of an interface between fluids having different specific gravities in an upper tank is steadily maintained at a desired level by the pressure equilibrium between the internal pressure of the vertical pipe and the internal pressure of the extraction column, thereby maintaining the level of the interface with a simple control system.

In order to achieve the above object, according to one aspect of the present invention, there is provided a device for controlling an interface of a liquid-liquid extraction column, the device including: the liquid-liquid extraction column having a column body; and an upper tank and a lower tank respectively provided at an upper end and a lower end of the column body, the upper tank and the lower tank having respective inlet pipes and respective outlet pipes through which fluids having different specific gravities are introduced and discharged, wherein a pipeline is connected to the outlet pipe of the lower tank and the fluid discharged from the lower tank is raised through the pipeline, and an internal pressure of the extraction column and an internal pressure of the pipeline are balanced with each other by controlling a level of the fluid raised in the pipeline, thereby steadily maintaining a level of an interface between the fluids having different specific gravities in the upper tank.

Here, the pipeline may be formed by a vertical pipe connected to the outlet pipe of the lower tank and extending vertically in parallel to the extraction column, with an on/off valve provided on the vertical pipe so as to open and close the vertical pipe.

Here, the vertical pipe may be provided with a plurality of pressure control pipes that branch from the vertical pipe while being separated from each other in a height direction of the vertical pipe, and the on/off valve may be provided at each of the plurality of pressure control pipes.

The device for controlling the interface of the liquid-liquid extraction column using pressure equilibrium can realize various effects as follows.

The device can control the level of the interface between the fluids in the upper tank by the internal pressure of the vertical pipe. The vertical pipe is provided beside the extraction column, and enables the internal pressure of the extraction column and the internal pressure of the vertical pipe to be balanced with each other.

That is, the internal pressure of the extraction column is equal to the internal pressure of the vertical pipe. Therefore, the level of the interface in the upper tank is maintained by the internal pressure of the vertical pipe. In addition, when the level of the fluid in the vertical pipe is changed, the level of the interface can be changed.

Therefore, when controlling the interface with the vertical pipe, the number of control elements for the interface level maintaining work in the upper tank is less due to a simple control system. Also, the demand for maintenance can be reduced, thereby enhancing efficiency for the interface level maintaining work.

In addition, the device can efficiently respond to the change of the internal pressure of the extraction column by providing a plurality of pressure control pipes in the height direction of the vertical pipe.

That is, when a total density of the fluids in the extraction column is changed due to flow rate changes of the fluids introduced into the extraction column, etc., the internal pressure of the extraction column is changed. In response to the change of internal pressure of the extraction column, the level of the fluid in the vertical pipe is controlled by opening and closing the pressure control pipes, thereby easily controlling the level of the interface between the fluids in the upper tank of the extraction column.

DETAILED DESCRIPTION

Figure 1:
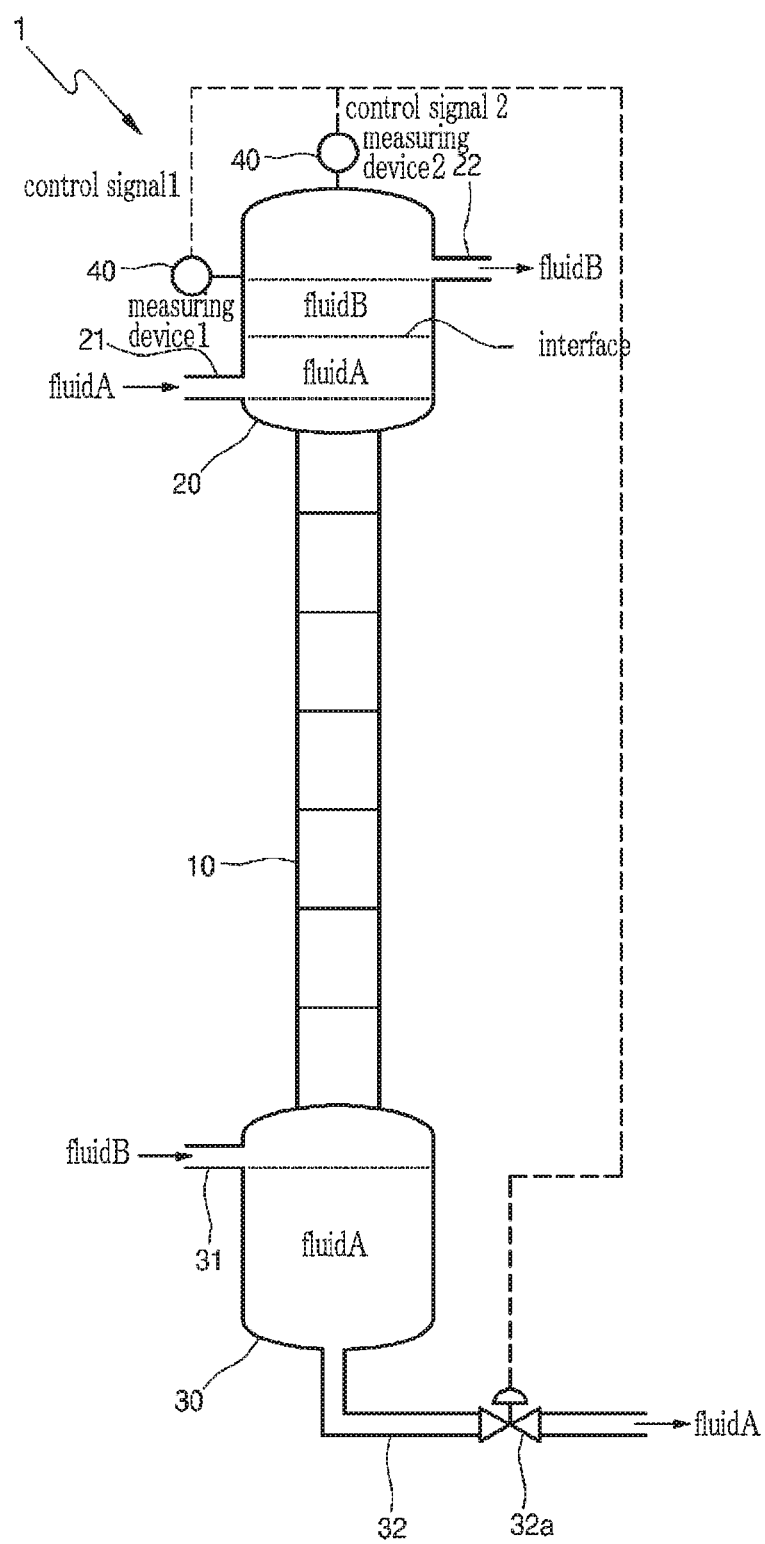
FIG. 1 is a schematic view showing a conventional liquid-liquid extraction column.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a device for controlling an interface of a liquid-liquid extraction column using pressure equilibrium according to an exemplary embodiment of the present invention will be described in reference with FIG. 2.

Prior to the description, the same reference numerals as those of the related art are assigned to the same elements.

The device for controlling the interface of the liquid-liquid extraction column using pressure equilibrium includes a vertical pipe that may obtain pressure equilibrium between the internal pressure of the vertical pipe and the internal pressure of the extraction column. Therefore, the device may steadily maintain a level of an interface between fluids having different specific gravities in an upper tank through which the fluids are introduced and discharged.

Therefore, the interface may be maintained by a simple control system and thus, the interface may be easily maintained, thereby reducing the demand for maintenance.

The device for controlling the interface of the liquid-liquid extraction column using pressure equilibrium includes a column body 10, an upper tank 20, a lower tank 30, a vertical pipe 100, a pressure control pipe 200, and an on/off valve 300.

First, the column body 10 connects the upper tank 20 and the lower tank 30, and is provided to be vertical to a ground surface.

In the column body 10, the fluids respectively introduced through the upper tank 20 and the lower tank 30 are mixed, and the mixture is separated in a vertical direction by the different specific gravities of the fluids.

The column body 10 may be one column body, or may be a combination of a plurality of column bodies that branch from the column body in a row.

Second, the upper tank 20 is a unit that a fluid (fluid A) having high specific gravity is introduced into, and that a fluid (fluid B) having low specific gravity is discharged from. The upper tank is provided at the upper end of the column body 10.

Here, an upper inlet pipe 21 and an upper outlet pipe 22 are respectively provided at one side and another side of the upper tank 20.

Third, the lower tank 30 is a unit that the fluid (fluid B) having low specific gravity is introduced into, and that the fluid (fluid A) having high specific gravity is discharged from. The lower tank is provided at the lower end of the column body 10.

Here, a lower inlet pipe 31 and a lower outlet pipe 32 are respectively provided at one side and another side of the lower tank 30.

Fourth, the vertical pipe 100 forms a pipeline through which the fluid discharged from the lower tank 30 via the lower outlet pipe 32 passes. By using the pressure of the fluid, the internal pressure of the extraction column 1 and the internal pressure of the vertical pipe are balanced with each other.

The vertical pipe 100 is provided beside the extraction column 1, and extends vertically in parallel to the extraction column 1.

The internal pressure of the vertical pipe 100 is generated by moving the fluid discharged from the lower tank 30 into the vertical pipe 100, thereby steadily maintaining the level of the interface between the fluids having different specific gravities in the upper tank 20.

Fifth, the pressure control pipe 200 controls the internal pressure of the vertical pipe 100 in stages, the internal pressure of the vertical pipe generated by the fluid raised in the vertical pipe 100. Therefore, the internal pressure of the extraction column 1 and the internal pressure of the vertical pipe are balanced with each other.

That is, when the internal pressure of the extraction column 1 is determined, it is required to control the internal pressure of the vertical pipe 100 equal to the internal pressure of the extraction column. The level of the fluid introduced into the vertical pipe 100 is controlled by opening and closing the pressure control pipe 200, thereby controlling the internal pressure of the vertical pipe 100.

Here, the pressure control pipe 200 is a plurality of the pressure control pipes in a height direction of the vertical pipe 100.

Figure 2:
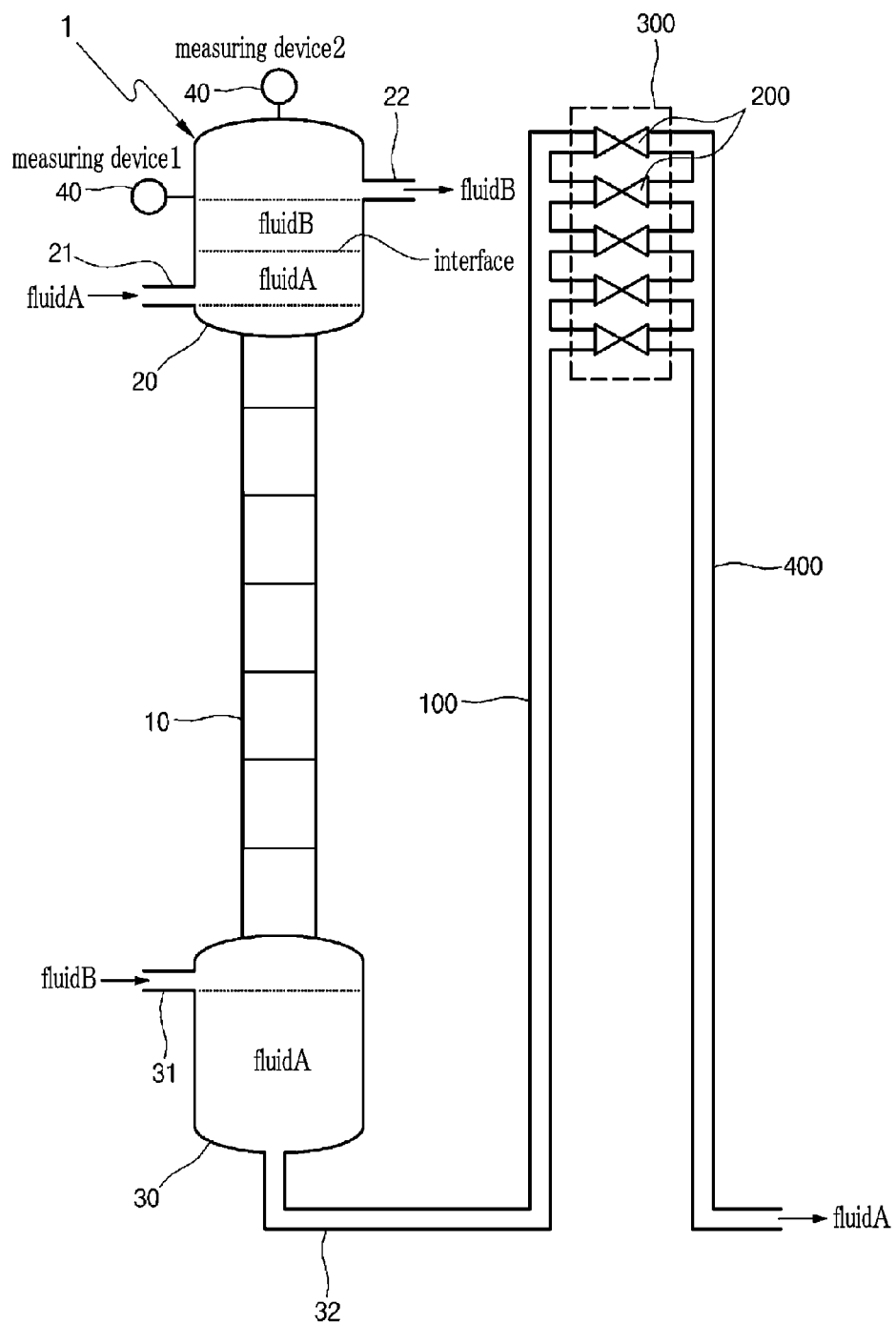
FIG. 2 is a schematic view showing a device for controlling an interface of a liquid-liquid extraction column using pressure equilibrium according to an exemplary embodiment of the present invention.

Here, the pressure control pipes 200 are provided at different heights, and are parallel to each other as shown in FIG. 2.

Sixth, the on/off valve 300 opens and closes the pressure control pipes 200, and is provided at each of the pressure control pipes 200.

That is, the on/off valve 300 opens and closes each of the pressure control pipes 200 such that the level of the fluid in the vertical pipe 100 is controlled.

In the meantime, an outlet drain 400 is provided at an end of each of the pressure control pipes 200 to combine the pressure control pipes 200.

That is, the fluid discharged through the opened pressure control pipes 200 moves to a predetermined position via the outlet drain 400.

Hereinafter, operation of the device for controlling the interface of the liquid-liquid extraction column using pressure equilibrium having the above-described configuration will be described.

First, the internal pressure of the extraction column that the fluid is introduced into is calculated, and the process of calculating the internal pressure of the extraction column will be described as follow.

Except for external force such as pulsation, etc., the internal pressure of the extraction column 1 is only related to density of and a total level of the fluids in the extraction column 1.

In an equilibrium state, a total level of the fluids in the extraction column is fixed to the level of the upper outlet pipe 22 of the upper tank 20. Therefore, the internal pressure of the extraction column 1 is determined by total density of the fluids in the extraction column 1.

Two fluids having different densities are in the extraction column. An inflow rate and an outflow rate of each of the fluids are steadily maintained. Therefore, the total density of the fluids in the column body 10 is determined based on a ratio of flow rate.

Therefore, the total density of the fluids in the extraction column 1 is determined by a ratio of presence of the fluids in the upper tank 20, namely, the level of the interface.

As described above, when the internal pressure of the extraction column is calculated at the time of the interface located at a desired level in the upper tank 20, the level of the fluid in the vertical pipe 100 is derived based on a range of the calculated internal pressure.

Next, when the level of the fluid in the vertical pipe 100 is derived, the on/off valve 300 of the pressure control pipes 200 is correspondingly opened.

Therefore, the level of the fluid introduced into the vertical pipe 100 from the lower tank 30 of the extraction column 1 is maintained at a position lower than the opened on/off valve of the pressure control pipes 200.

Consequently, the internal pressure of the extraction column 1 and the internal pressure of the vertical pipe 100 are balanced with each other. In addition, the level of the interface between the fluids in the upper tank 20 is maintained at a level for the balance.

In the meantime, the internal pressure of the extraction column 1 may be variable due to different densities of the two fluids introduced into the extraction column 1, or due to an external condition.

Here, the internal pressure of the extraction column 1 and the internal pressure of the vertical pipe are balanced with each other by controlling the opening of the pressure control pipes 200 provided at different heights in the vertical pipe 100.

As described up to now, the device for controlling the interface of the liquid-liquid extraction column using pressure equilibrium includes the vertical pipe provided beside the extraction column. The device can control the level of the interface between the two fluids in the upper tank of the extraction column by artificially enabling the internal pressure of the extraction column and the internal pressure of the vertical pipe to be balanced with each other.

Therefore, the interface can be steadily maintained by the simple control system, and the demand for maintenance can be reduced, thereby enhancing efficiency for the interface level maintaining work.

While the present invention has been particularly shown and described with reference to exemplary embodiments thereof, it will be understood by those of ordinary skill in the art that various changes and modifications may be made therein without departing from the technical idea and scope of the present invention and such changes and modifications belong to the claims of the present invention.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for controlling an interface of a liquid-liquid extraction column, the device comprising:
    the liquid-liquid extraction column including: a column body; and an upper tank and a lower tank respectively provided at an upper end and a lower end of the column body, the upper tank and the lower tank having respective inlet pipes and respective outlet pipes through which fluids having different specific gravities are introduced and discharged,
    wherein a pipeline is connected to the outlet pipe of the lower tank and the fluid discharged from the lower tank is raised through the pipeline, and an internal pressure of the extraction column and an internal pressure of the pipeline are balanced with each other by controlling a level of the fluid raised in the pipeline, thereby steadily maintaining a level of an interface between the fluids having different specific gravities in the upper tank:
    wherein the pipeline comprises a vertical pipe connected to the outlet pipe of the lower tank and extending vertically in parallel to the extraction column, an outlet drain provided next to the vertical pipe at the same height as the vertical pipe and a plurality of pressure control pipes that branch from the vertical pipe to the outlet drain, with an on/off valve provided at each of the plurality of pressure control pipes to switch on/off the plurality of pressure control pipes, respectively.

* * * * *